United States Patent [19]

Turner

[11] 4,082,391
[45] Apr. 4, 1978

[54] STOWABLE GALLEY

[76] Inventor: Roland P. Turner, 2600 S. Kanner Hwy., Apt. N1, Stuart, Fla. 33494

[21] Appl. No.: 750,612

[22] Filed: Dec. 15, 1976

[51] Int. Cl.² ............................................. A47B 77/10
[52] U.S. Cl. ................................. 312/314; 126/37 A; 126/37 B; 220/18; 220/255; 126/332; 312/237; 312/228
[58] Field of Search ................... 126/24, 37, 216, 332; 312/314, 317, 237, 248, 228, 229, 236, 282; 219/444, 445, 446, 447; 220/18, 255; 296/23 R; 114/1.1, 1.7, 3

[56] References Cited

U.S. PATENT DOCUMENTS

| 658,999 | 10/1900 | Scannell | 312/317 R X |
|---|---|---|---|
| 925,232 | 6/1909 | Sandstrom | 220/18 |
| 1,000,185 | 8/1911 | Melton | 126/216 |
| 1,092,681 | 4/1914 | Way | 126/37 B |
| 2,222,960 | 11/1940 | Strachan | 312/237 X |
| 3,064,554 | 11/1962 | Lamb | 126/37 B |
| 3,113,817 | 12/1963 | Imel | 220/18 X |
| 3,915,529 | 10/1975 | Bermier | 126/37 B X |

FOREIGN PATENT DOCUMENTS

| 1,028,361 | 4/1958 | Germany | 312/228 |
|---|---|---|---|
| 185,637 | 10/1936 | Switzerland | 126/37 B |

*Primary Examiner*—William F. O'Dea
*Assistant Examiner*—Harold Joyce
*Attorney, Agent, or Firm*—Malin & Haley

[57] ABSTRACT

A pivotally mounted, stowable galley which may include a sink, a stove, storage and work areas, the galley having a "down" storage position flush with a vertical surface to which it is attached and an "up" operational position substantially perpendicular to the vertical surface. The galley includes an elongated but relatively thin (in height) rectangular box which houses a sink, a stove (if desired), and storage areas and a double hinged counter top which serves as the galley box closure or lid. The galley is mountable on a boat gunnel overhang and vertical or horizontal wall surfaces and is intended for use in confined areas where space is at a premium, such as in boats, recreational vehicles and the like. When not in use, the galley pivots downwardly increasing available space and occupying very little space when stowed. When in use, complete galley facilities are provided including a sink, a stove, storage areas and adequate counter space. The galley box includes a pair of separate counter top surfaces hinged together which are moveable between a closed position and a box overhang position for extra counter-top space. Since the height of the galley box is relatively smaller than the width (viewed horizontally), less surrounding space is utilized in the storage position.

6 Claims, 9 Drawing Figures

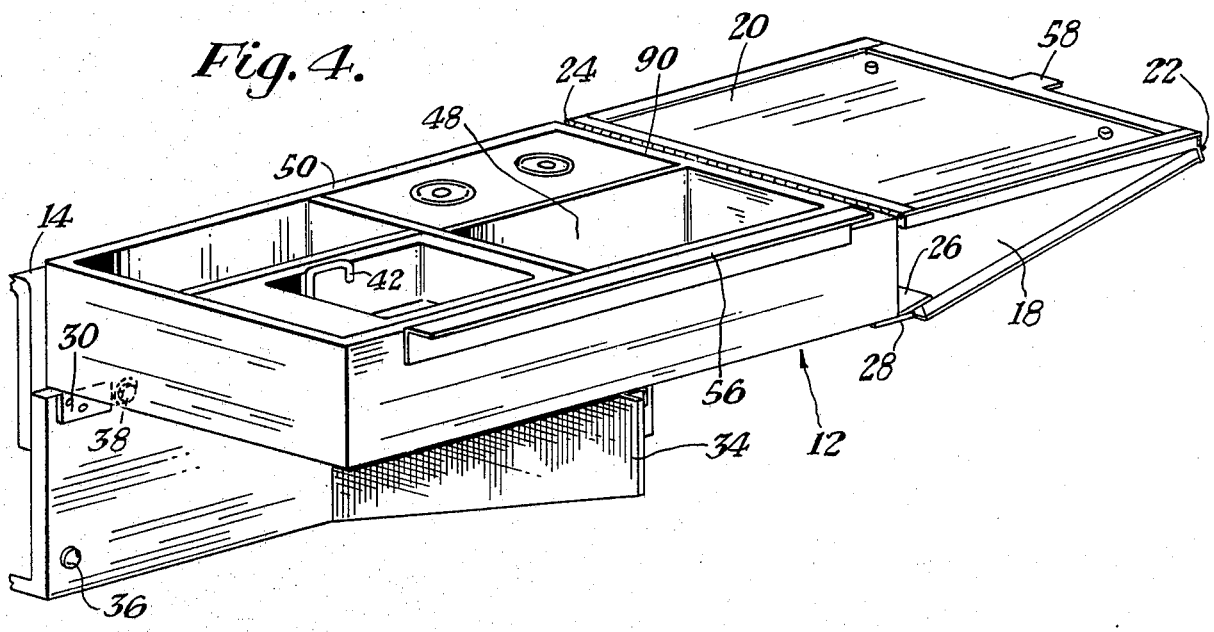
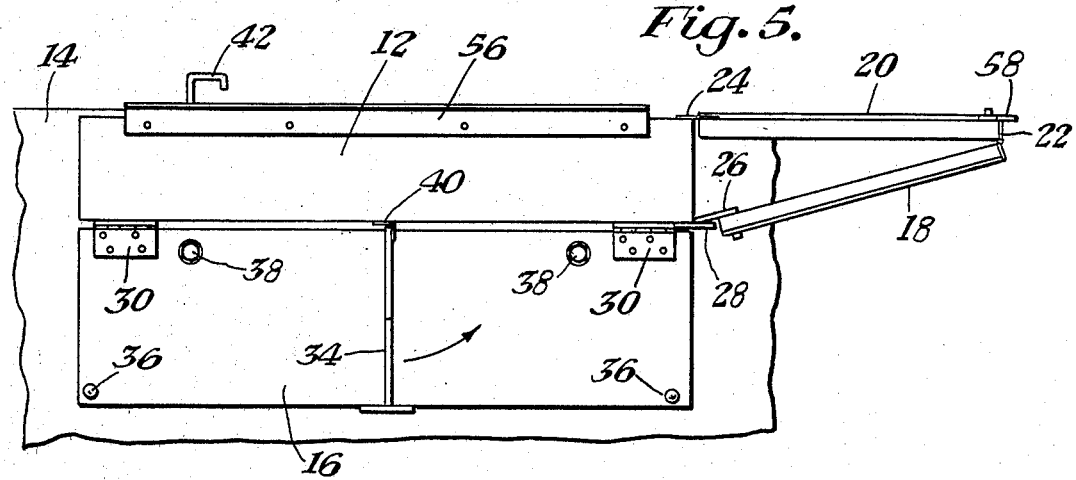
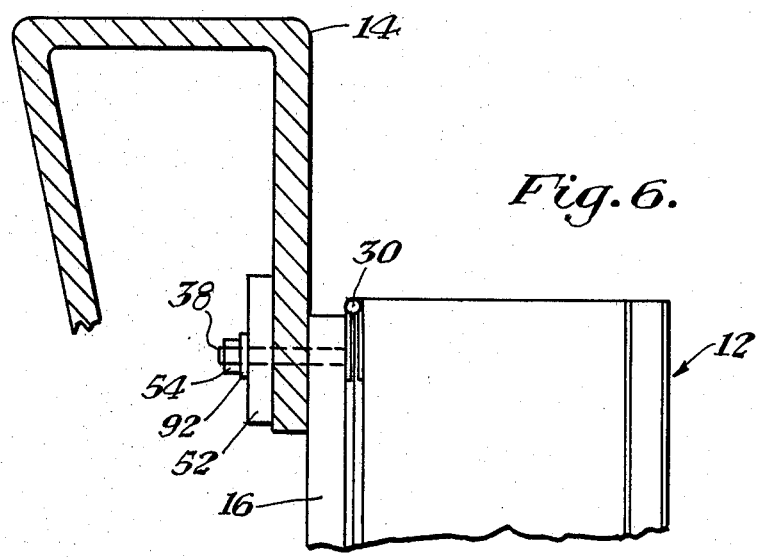

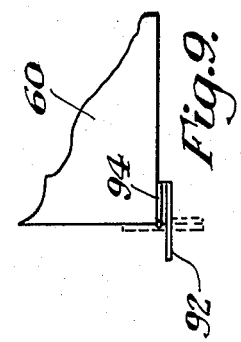
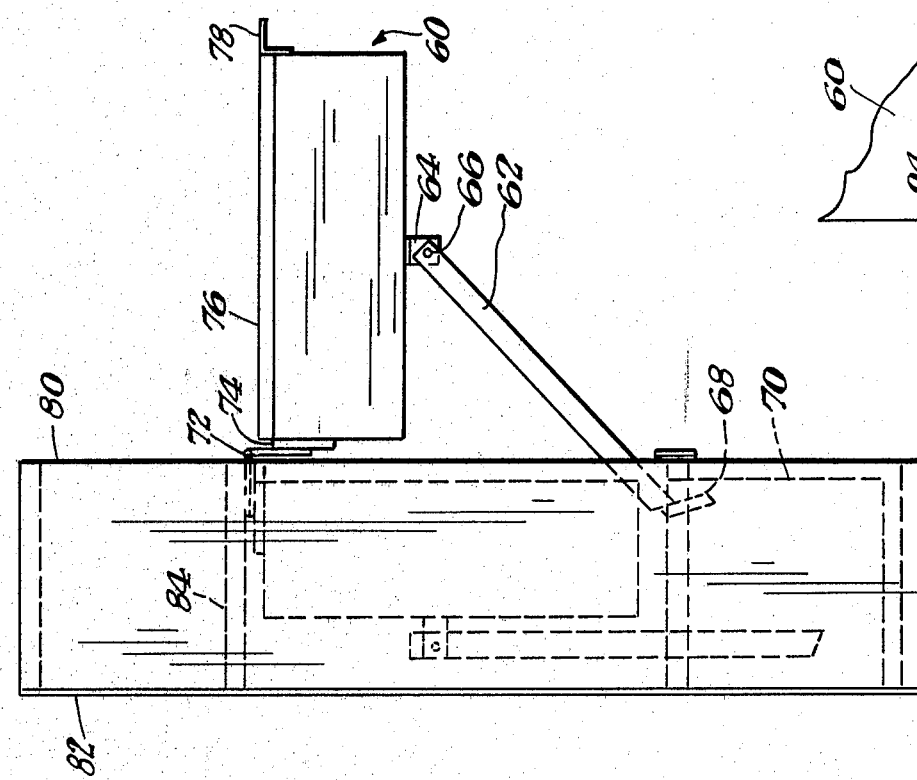
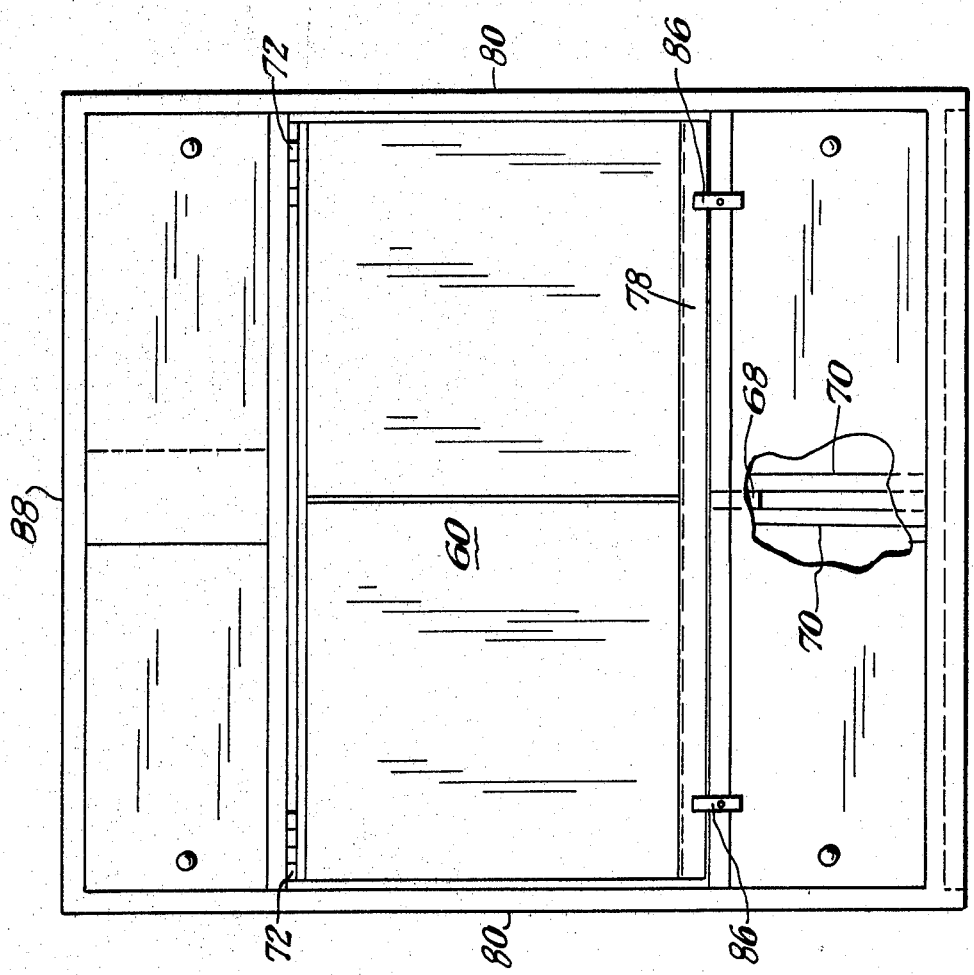

STOWABLE GALLEY

BACKGROUND OF THE INVENTION

This invention relates generally to a kitchen galley that is readily stowable, when not in use, for utilization in living areas having limited space, and specifically to a hingeable, gunnel, wall or shelf mounted galley that may include a sink, storage area, and counter top space for use in confined environments such as boats, mobile travel homes, trailers and the like.

In many boats and recreational mobile vehicles, kitchen space is at a premium due to the confined environment presented. One of the problems presented with proper utilization of galley space is that although the galley space is necessary, it is only used for relatively short periods of time. Thus, in areas where space is critical, the galley area represents wasted space when the galley is not in use.

The invention herein described solves the problem of wasted space in the galley area when the galley is not actually being used by providing a stowable galley which includes a sink, a stove, storage space and adequate counter top space which is readily and conveniently movable into a working position and yet is hingeably moveable to a stowed position when not in use, reducing wasted space.

The galley includes a large rectangular receptacle which is hingedly mounted along one bottom edge to a vertical surface such as a boat gunnel, mobile home wall cabinet shelf or the like which allows pivotal positioning between vertical and horizontal positions. The galley receptacle also includes a double hinged cover that provides additional counter top working area extending beyond one side of the receptacle.

BRIEF DESCRIPTION OF THE INVENTION

A stowable galley comprising a rigid receptacle hingeably mounted along one edge (top or bottom) to a hanger board, the hanger board being attachable to a vertical or horizontal surface. Attached to the bottom surface of the rigid receptacle is a hinged and moveable brace which engages a brace stop or vertical wall surface to support the entire receptacle in its operational (horizontal) position. The brace is moveable to an out of the way position parallel to the bottom of the receptacle when the device is in the stowed position.

The galley receptacle includes a pivotable closure or top which is hinged along one edge to an end surface of the receptacle, the top including a second hinge which divides the top into two relatively moveable countertop section areas. The top of the receptacle can be utilized in one of three positions, which include the closed position for full counter-top, a half-open position in which one section of the top is folded on top of the other along its hinged portion, exposing the galley sink and storage area, (approximately one half of the galley receptacle area), or in the full galley open position in which the top is rotated to extend and overhang beyond the end of the receptacle with one hinged section serving as the brace for the other section which serves as additional counter space.

The galley sink mounted in one section of the galley receptacle includes a fold down, rotatable spigot and flexible tubing which is attached to the spigot and drain allowing for pivotal movement of the galley.

A cooking stove can be mounted next to the sink within the receptacle storage space.

The galley may further include moveable partitions fixed by set screws to adjust the size of compartments within the receptacle.

The hanger board is attached to a rigid vertical or horizontal surface and may be shaped to provide additional structural bracing for the entire unit. For example, the hanger board may be L-shaped to be used with an overhanging gunnel such that the board is affixed to the gunnel by a plurality of bolts and nuts, with the lower portion of the hanger board contracting the boat hull.

A rigid, protruding flange is provided along one end edge of the closure which also serves to engage a similar flange coupled to one end side of the receptacle to support a portion of the closure top in a shelf position.

In another embodiment the stowable galley may be enclosed for operational use in a cabinet having a plurality of additional shelves. In this particular embodiment the galley receptacle is hingeably mounted to a horizontal shelf along the front edge underside of the shelf and the upper rear edge of the galley receptacle. In this embodiment the supporting brace is pivotally mounted to move within a vertical plane and engages a brace stop which is affixed to a pair of divider boards which comprise the bottom shelf of the cabinet. The divider boards provide for space to receive the brace when the galley is in the stowed position. In this embodiment, in the stowed position, the galley is thus mounted within the recessed portions of the cabinet itself, thus providing and utilizing existing shelf space only for stowage. The cabinet may include a top and bottom shelf having sliding doors or other suitable enclosures with the galley receptacle mounted in an intermediate shelf disposed between the upper and lower shelves.

Is is an object of this invention to provide a stowable galley for utilization in a confined environment.

It is another object of this invention to provide increased galley counter space and a galley sink which are readily stowable, when not in use.

But yet still another object of this invention is to provide a galley that may be easily mounted to a boat gunnel or vertical wall environment reducing galley installation cost.

And yet still another object of this invention is to provide a stowable galley which includes a sink, stove, and other storage areas which may be mounted within a cabinet, and stowable within the cabinet interior space.

Another object of this invention is to provide a pivotable galley having an improved, rigid yet non-complex support for the operational position.

In accordance with these and other objects which will be apparent hereinafter, the instant invention will now be described with particular reference to the accompanying drawings.

BRIEF DESCRIPTION OF THE DRAWINGS

FIG. 4 shows a perspective view of the instant invention in the full open operational position.

FIG. 5 shows a front elevational view of the instant invention in the full open operational position.

FIG. 6 shows a side elevational view, partially cut away, of the instant invention mounted on a boat gunnel skirt.

FIG. 7 shows an alternate embodiment of the instant invention in a side elevational view showing the galley receptacle in the operational position and mounted to a cabinet.

FIG. 8 is a front elevational view of the embodiment shown in FIG. 7.

FIG. 9 shows a front elevational view of a hinged supporting lip connected to the lower corner edge of the receptacle utilized with the embodiment as shown in FIGS. 7 and 8.

PREFERRED EMBODIMENT OF THE INVENTION

Figure 1:
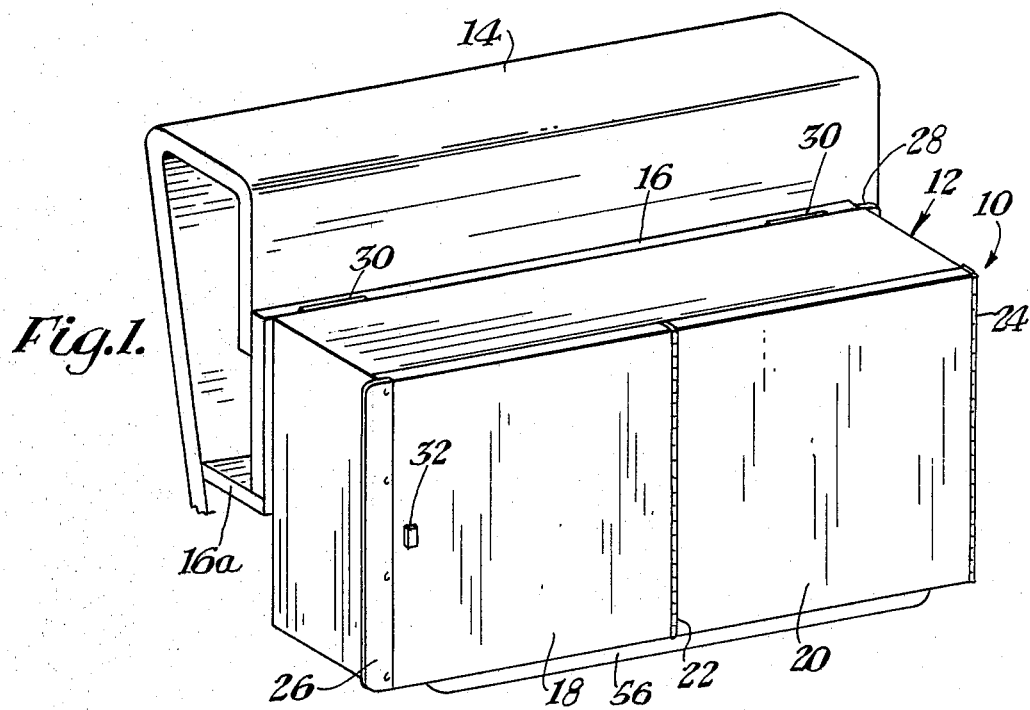
FIG. 1 shows a perspective view of the instant invention in the stowage position.

Referring now to the drawings, one embodiment of the invention 10 is shown mounted on boat gunnel 14 with hanger board 16 having a perpendicular bottom brace 16a that engages the interior hull surface of the boat. The galley includes a rigid, rectangular housing or box 12, which is attached by hinges 30, along the bottom edge of the box (when mounted horizontally) to the hanger board 16. FIG. 1 shows the stowed, covered position of the galley and the moveable closure top comprised of a first planar panel 18 hingeably connected by hinge 22 to second planar panel 20, attached to one end of the receptacle 12 by hinge 24. A rigid extending lip 26 is connected to one end of lid 18. A lock 32 secures the entire moveable top to the receptacle in the covered position. The galley in this position occupies very little surrounding space. The housing 12 may be secured in the stowed position to the hanger board or fixed wall surface by a suitable fastener (not shown) to prevent undesired pivotal movement when stowed.

Figure 2:
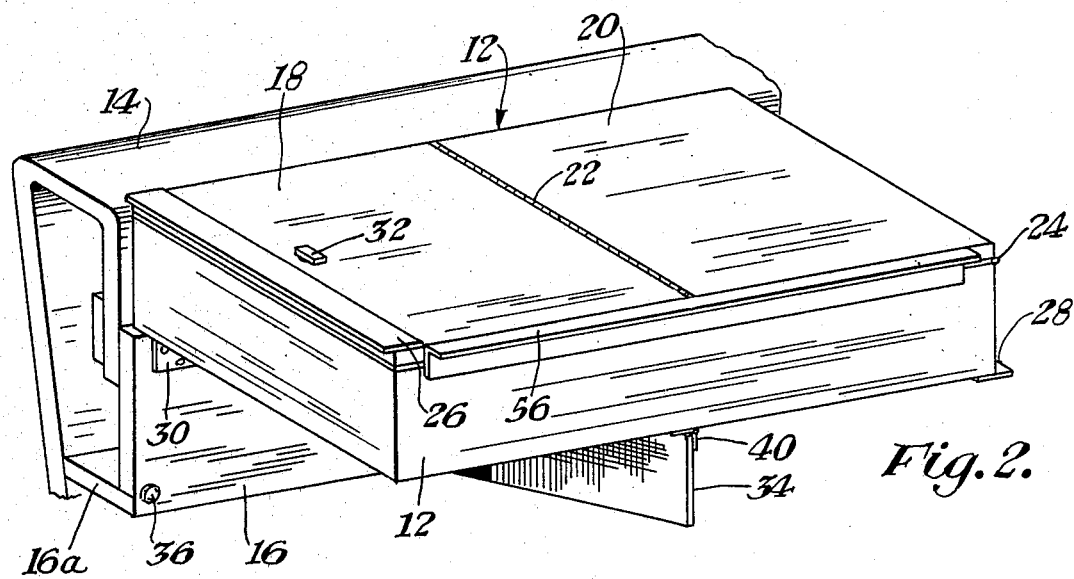
FIG. 2 shows a perspective view of the instant invention in the up, operational position with the top cover in a closed position.

FIG. 2 shows the galley 10 disposed in its operational upright position. The galley housing 12 is supported in a horizontal position by a hinged pivotal brace 34 connected to the underside of the galley housing by hinge 40. The moveable brace 34 engages either the hanger board or a wall surface to maintain the housing in a rigid, horizontal position. As shown in FIG. 2, (with the top cover still locked in place) the galley may be utilized as a counter top work surface area if desired. The hanger board 16 is attached to the gunnel 14 by a bolt 38 disposed through the hanger board and the gunnel skirt (FIG. 6).

Figure 3:
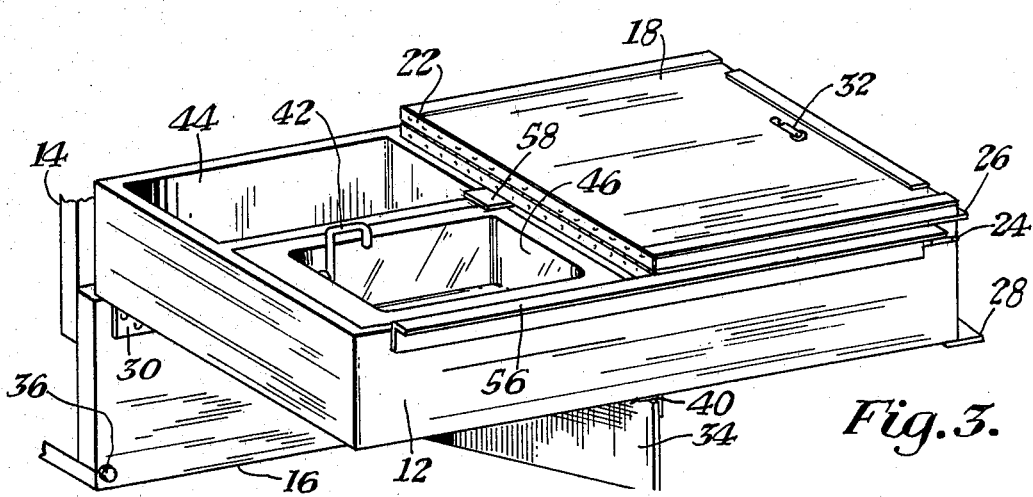
FIG. 3 shows a perspective view of the instant invention with the cover having one hinged section open.

FIG. 3 shows one panel 18 of the galley box cover after it has been pivoted 180°, uncovering the left side of the galley providing access to a sink 46 and storage space 44, the sink including a fold up or fold down, rotatable spigot 42. In this configuration, first panel 18 acts as a counter top work surface area which may be utilized in conjunction with the sink 46. A left handle 58 connected to one end of panel 20 allows for the counter top to be opened fully as described below.

FIG. 4 shows the galley with the top cover fully opened providing access to additional storage area 48 and stove 90 within the galley housing while providing counter top surface area panel 20 which is held in a horizontal position by counter top panel end lip 26 which engages flange 28 connected to the bottom of the galley housing 12. The hinge 22 between the second counter panel 20 and the first counter panel 18 allows for rotation of counter panel 18 to be positioned as shown to act as a rigid brace for counter segment 20.

FIG. 5 shows the pivotal direction of the supporting brace 34 which rotates flush with the bottom surface of the housing, allowing the galley to be dropped to the stowed position. A plurality of supporting bolts 38 are connected through the hanger board into the gunnel skirt. Rubber stops 36 allow the bottom of the housing 12 to rest against the hanger board 16.

FIG. 6 shows how the hanger board 16 is connected to the gunnel skirt by elongated bolts 38 connected to a threaded nut 54 including a washer 92 and spacer 52. The hanger board may also include rubber stops 36 (FIG. 5) and a locking hook (not shown) to hold the device firmly in the stowed position. The galley may be constructed of any conventional rigid material such as wood metal, plastic, or the like.

FIG. 7 shows an alternate embodiment of the galley mounted in a cabinet which includes a rectangular galley housing 60 which is in the form of a box or receptacle that is hingeably mounted to a horizontal shelf 84 along the upper back rear edge of the galley housing 60. A hinge 72 is connected to the underside of the shelf 84 and to a spacing block 74 attached to the back wall of the galley box 60. In this embodiment, the galley receptacle box is similar to the previous embodiment with the exception of the hinge mounting of the box and the supporting brace and its disposition in a cabinet. In this embodiment a brace leg 62 is pivotally connected by screws to a mounting block 64 attached to the bottom surface of the receptacle housing. The device is mounted in a cabinet 80 having a cabinet back 82, with the bottom shelf having a pair of vertical divider boards 70 (FIG. 8) with a space disposed therethrough and a brace leg stop 68 attached at the upper portion. Thus a galley swings outwardly from a stowed position within the intermediate shelf portion between the top shelf 84 and a lower shelf into a horizontal operational position with a leg brace free end engaging the leg brace stop 68. In the stowed galley position, the leg brace 62 freely swings within the cabinet (leg brace shown dotted) between the divider board 70. In FIG. 8 the galley is shown in the stowed and locked position with a pair of securing fasteners 86 which rotate allowing the galley to be firmly locked within the entire cabinet. In this embodiment additional shelf space is provided in conjunction with the counter top usable space shown in the above embodiment, the galley being stowed and occupying no additional surrounding area or space greater than the depth of the cabinet itself. This embodiment of the instant invention may be utilized in any particular area where space limitations are critical. The filler board 74 acts to remove binding contact between the hinges and the galley box closure panels or lids. The operation of the counter top 76 is identical with the first embodiment described hereinabove.

FIG. 9 shows a moveable lip 92 attached to the bottom edge at one end of the galley housing 60. In the position as shown, the lip 92 engages one end of the closure to provide extended counter top space (similar to lip 28 in FIG. 5). Because of the cabinet mounting and the small space between the galley housing 60 and the cabinet walls 80, a hinge 94 allows the lip 92 to be rotated to the dotted position parallel to the galley housing side, permitting the galley box to be stowed in the cabinet 80. If the hinge 94 and lip 92 are attached on the lower right hand corner of the housing 60 (similar to location of lip 28 in FIG. 5) then the view of FIG. 9 is from inside the cabinet 80.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A stowable galley moveable from a first horizontal, operational position to a second stowed vertical position for increasing the utilization of living space in a relatively confined area comprising:

a rigid receptacle having a height substantially less than its width;

a first pivotal receptacle mounting means connected on one side of said receptacle for pivotally connecting said receptacle to a supporting surface, said receptacle pivotal from a horizontal to a vertical position;

a receptacle closure pivotally connected to said receptacle;

a pivotal connecting means connected to one end of said receptacle and to one end of said closure;

a means for supporting said receptacle in a horizontal position connected to said receptacle;

a closure supporting means connected to one side of said receptacle and to said pivotal closure whereby said pivotal closure is moveable to an extended horizontal position beyond the end of said receptacle providing a counter top surface outside of said receptacle;

said pivotal closure including a first panel and a second panel;

a hinge means connected to said first panel and said second panel, the first panel pivotally movable relative to said second panel, said first and second panels moveable relative to said receptacle to form a counter top over one portion of said receptacle;

a sink disposed within said receptacle;

a rotatable spigot coupled within said sink, said spigot rotatable from an up position to a down position within said sink;

said pivotal supporting means including a rigid flange coupled to one edge of said receptacle; and a rigid lip connected to one end of said first panel of said pivotal closure, said lip engageable with said rigid edge flange to support said second panel in a horizontal position providing a counter top outside of said receptacle.

2. A stowable galley as in claim 1, wherein:

said receptacle pivotal mounting means includes a hinge coupled along the bottom side edge for connecting said receptacle to a vertical, rigid planar surface.

3. A stowable galley as in claim 1, wherein:

said first receptacle pivotal supporting means includes a hinge mounted to the top side edge of said receptacle for mounting said receptacle to a rigid horizontal planar surface.

4. A stowable galley as in claim 1, including:

a cooking stove disposed within said receptacle.

5. A stowable galley as in claim 1, wherein:

said receptacle mounting means includes a mounting board; and a plurality of fasteners disposable between said mounting board and a rigid vertical surface.

6. A stowable galley as in claim 1, wherein:

said receptacle horizontal supporting means includes a moveable brace pivotally connected on the bottom side of said receptacle.

* * * * *